H. SEEMANN.
WORM FOR WORM GEARINGS.
APPLICATION FILED SEPT. 3, 1921.

1,421,580. Patented July 4, 1922.

Inventor
Henry Seemann
By Lawrence Langner
Attorney

UNITED STATES PATENT OFFICE.

HENRY SEEMANN, OF HAMBURG, GERMANY.

WORM FOR WORM GEARINGS.

1,421,580.  Specification of Letters Patent.  Patented July 4, 1922.

Application filed September 3, 1921. Serial No. 498,468.

*To all whom it may concern:*

Be it known that I, HENRY SEEMANN, a citizen of Germany, residing at Hamburg, in Germany, have invented certain new and useful Improvement in a Worm for Worm Gearings (for which I have filed application in Germany, October 4th, 1919), of which the following is a specification.

It has already been proposed to form the screw threads of a worm by series of rollers arranged in helices and rotatable about radial axes. Such arrangements, however, have the disadvantage that the roller studs wear very rapidly with the result that the worms or worm wheels very soon become useless.

In order to avoid this disadvantage according to the present invention an attachment of roller studs is provided in such manner, that they may be easily detached or interchanged and that the studs cannot become loose during operation. For this purpose there are provided fastening or securing rings arranged on the worm shaft and adapted to clamp the roller studs between them. This object in view, the rings are provided with semi-circular recesses on their side faces and are so arranged in relation to the adjacent rings that the recesses of two rings afford cylindrical stud holes. The rings are preferably so arranged on the worm shaft and the recesses are so dimensioned as to provide a small space between the successive rings; thus by pressing the rings together, the studs inserted into the round holes are firmly held in position.

Figure 1:
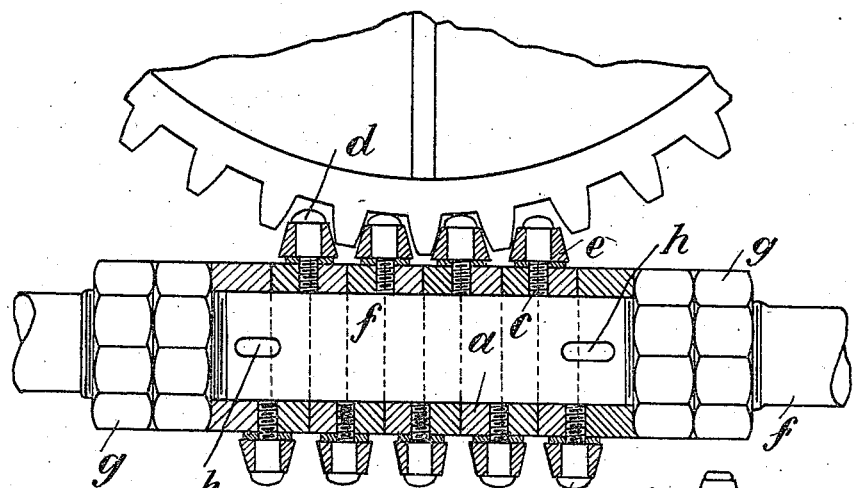

Figure 1 of the drawing is an elevation of a worm gearing, the worm proper being shown in longitudinal section and the worm wheel broken away.

Figure 2:
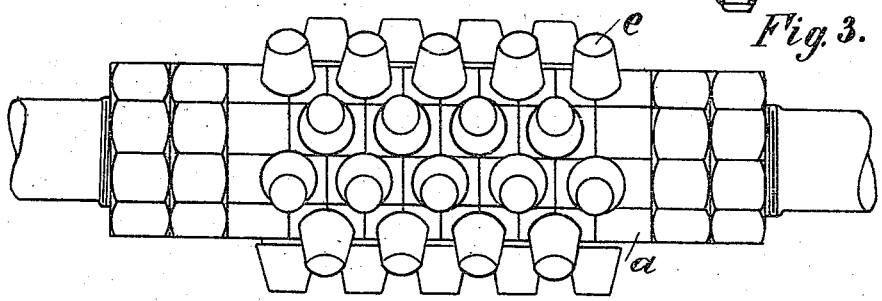

Figure 2 is a plan view of the worm.

Figure 3:
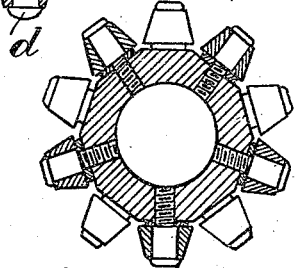

Figure 3 a cross section.

Figure 4:
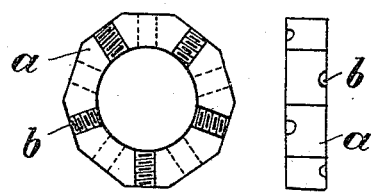

In Figure 4 one of the rings is shown in elevation and end view.

In the construction illustrated by way of example rings $a$ fit tightly around the worm shaft $f$, the width of the rings corresponding to half the distance of the screw thread formed by the rollers. On their end faces these rings are provided with semi-circular recesses $b$, which are in staggered relation to the two side walls, so that in the assembled position of the rings by the recesses, round holes are formed in the pairs of the rings. By arranging the recesses in staggered relation, the round holes will lie in a helix. The distance apart of the staggered recesses in each ring corresponds preferably to the distance apart of the screw threads, so that these run at an angle of about 60° and the worm affords a multiplex screw thread.

The circular holes formed by two opposite recesses are adapted to firmly hold the feet $c$ of the studs $d$, which form journals for the rollers $e$. The feet $c$ of these rollers are provided with a male screw thread, while the holes are correspondingly provided with an inner screw thread.

To form the inner screw threads on the recesses $b$, between each pair of the successive rings thin intermediate sheet metal disks, not shown, are arranged on the shaft and while the rings are held together in a suitable manner, the screw threaded holes are cut, using the inserted sheet as the centre line. There are thus formed internal screw threads, which must fit to the outer screw threads of the feet $c$ of the studs $d$. Thereupon the worm can be built up by removing the intermediate auxiliary sheets and loosely arranging the rings $a$ on the shaft $f$ in such manner that each pair of successive rings register. In the openings so left the studs $d$ are screwed, whereupon the rings are clamped together by nuts $g$ screw threaded on the shaft $f$, whereby the studs are firmly held.

The shaft $f$ may have any suitable cross-section, where the rings are positioned, in which case the rings are formed with a correspondingly shaped passage. In the example shown the shaft is cylindrical. By means of a wedge or a key $h$ or the like passed through the outermost rings and permitting actual movement, the rings can be prevented to rotate with respect to the shaft.

I claim:

1. A worm for worm gearings, comprising rollers arranged in rows forming the screw threads of the worm, studs forming the pivot pins for the rollers, a series of rings on the shaft of the worm, each ring provided with recesses, each recess registering with a recess of the next following ring to form a circular hole, the pivot studs of the rollers screwed into these holes.

2. A worm for worm gearings, comprising rollers arranged in rows forming the screw threads of the worm, studs forming the pivot pins for the rollers, a series of rings on the shaft of the worm, each ring provided with recesses, each recess registering with a recess of the next following ring to form a circular hole, the pivot studs of the rollers being screwed into these holes and the rings arranged at a slight distance apart, nuts screwed on the shaft and adapted to clamp the series of rings together.

3. A worm for worm gearings, comprising rollers arranged in a row forming the screw threads of the worm, studs forming the pivot pins for the rollers, a series of rings on the shaft of the worm, each ring provided with recesses arranged on one side of the rings in a staggered position with relation to the recesses on the other side, each recess registering with a recess of the next following ring to form a circular hole, the pivot studs of the rollers screwed into these holes.

HENRY SEEMANN.

Witnesses:
 EMIL HAGER,
 PETER LAUER.